United States Patent [19]

Taylor

[11] 3,851,310

[45] Nov. 26, 1974

[54] LINE SEARCHING ARRANGEMENT HAVING PRIORITY SEQUENCE

[75] Inventor: Frank Finley Taylor, Glen Ellyn, Ill.

[73] Assignee: Bell Telephone Laboratories, Incorporated, Murray Hill, N.J.

[22] Filed: May 3, 1973

[21] Appl. No.: 356,709

[52] U.S. Cl. ...................... 340/147 L P, 340/147 R

[51] Int. Cl. ............................................ H04q 9/00

[58] Field of Search ...... 340/415 R, 147 LP, 147 R, 340/152 R; 179/15 AT, 15 AL

[56] References Cited

UNITED STATES PATENTS

| | | | |
|---|---|---|---|
| 3,138,791 | 6/1964 | Beguin | 340/415 R |
| 3,524,185 | 8/1970 | Ehni | 340/415 R |
| 3,550,122 | 12/1970 | Siddigi | 340/415 R |

*Primary Examiner*—Harold I. Pitts

*Attorney, Agent, or Firm*—J. C. Albrecht

[57] ABSTRACT

A line search arrangement for determining if a preselected condition exists on any of a plurality of lines which responds to information request signals from a control unit by transmitting to the control unit the location of the first line, in accordance with a predetermined sequence, exhibiting the preselected condition. The line search arrangement further transmits to the control unit a signal indicating if additional lines are also exhibiting the preselected condition. The control unit transmits an additional information request signal to the line search arrangement each time it receives a signal from the line search arrangement indicating that additional lines are exhibiting the preselected condition.

7 Claims, 3 Drawing Figures

LINE SEARCHING ARRANGEMENT HAVING PRIORITY SEQUENCE

BACKGROUND OF THE INVENTION

This invention relates to line search systems and more particularly to such systems which operate in response to commands from a control unit.

Line search systems are generally employed to determine if a preselected condition exists at any scan point in a group of scan points and to communicate the identity of such a scan point to a control unit. In the case of telephone systems, subscriber lines which are connected to scan points are searched to determine if any subscriber sets have gone on-hook or off-hook. When any such change of state is detected, data concerning it is communicated to a control unit which responds by controlling switching operations with respect to the subscriber set which has changed state.

In prior art line search systems a control unit transmits a command to a search arrangement which responds by transmitting information concerning a set of scanned elements to the control unit. A set of scanned elements comprises, for example, a single line or a group of lines. No information is transmitted by the prior art search arrangements which indicates if any other sets of scanned elements have useful information to convey to the control unit. Thus, in certain situations the control unit transmits additional commands to the search arrangement when the search arrangement has no further information to convey to the control unit. Control unit time is lost during the transmission of a command and the evaluation of the results when no information can be gained from such a command.

In the present invention each reply from a search arrangement to the control unit conveys information about a set of scanned elements and also indicates whether or not useful information can be obtained by the control unit in response to a subsequent command. When the control unit receives a reply indicating that no information can be obtained by subsequent commands it terminates the search operations and proceeds to the performance of other functions. This saves the control unit time lost by the prior art systems.

SUMMARY OF THE INVENTION

In accordance with the present invention an arrangement for searching a plurality of lines comprises a control unit for transmitting information request signals and a search arrangement which responds to the information request signals by transmitting to the control unit the identity of a first line exhibiting a preselected condition and a signal indicating if more than one line is exhibiting the preselected condition. The control unit responds to the signal indicating that further lines exhibit the preselected condition by transmitting another information request signal.

DETAILED DESCRIPTION

Figure 1:
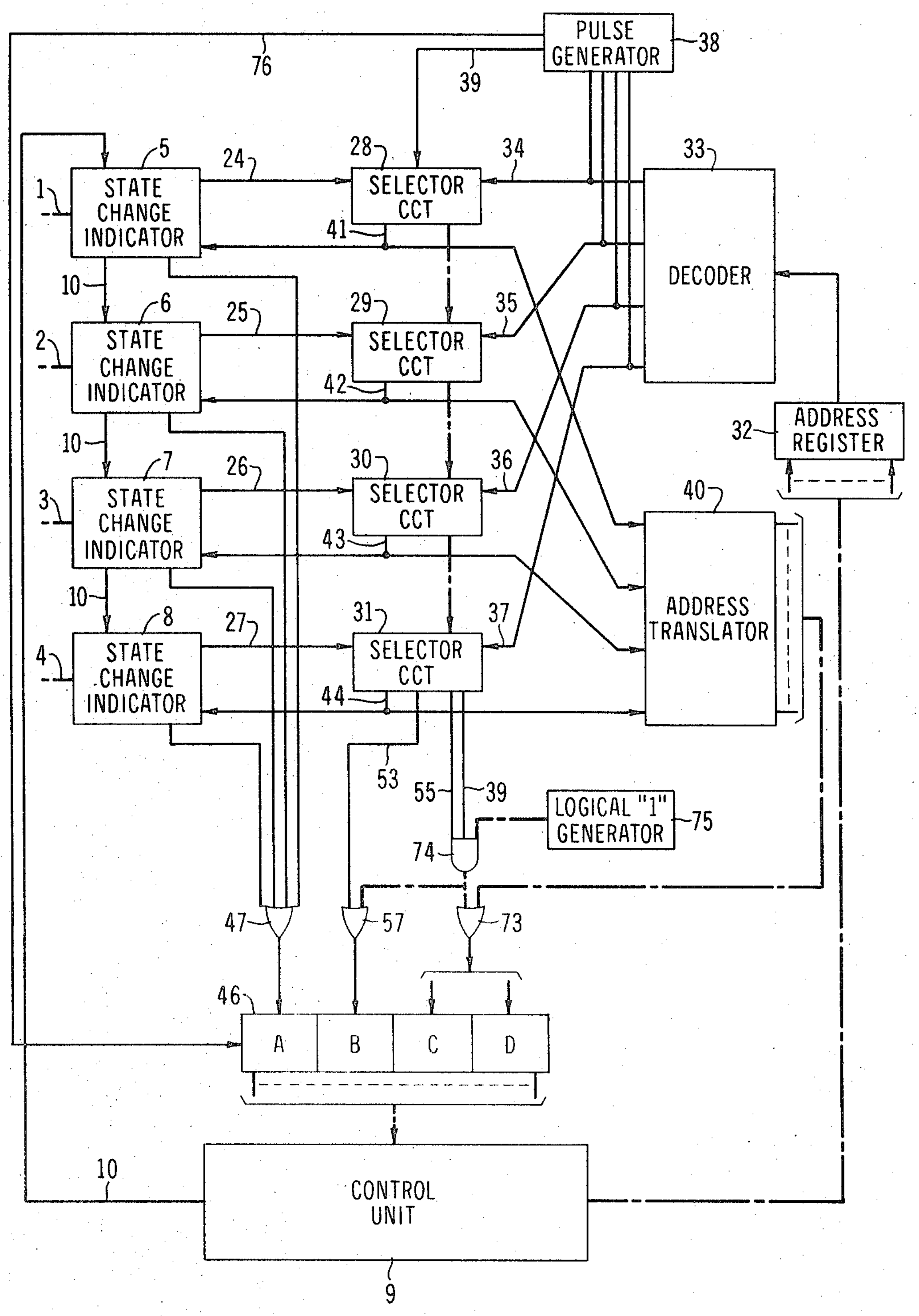
FIG. 1 is a functional block diagram of a specific embodiment of the invention.

FIG. 1 is a functional block diagram of a line search system embodying the present invention. This search system is employed to search a group of lines 1 through 4 to determine if the signal on any of these lines has changed from a logical 0 to a logical 1 or from a logical 1 to a logical 0 since the previous time these lines were searched. The lines 1 through 4 are searched during a line search sequence which is selectively started by a control unit 9 and terminated when no additional information is to be obtained about the lines being searched. The control unit 9 on termination of a line search sequence performs other functions and periodically starts a new line search sequence.

The lines 1 through 4 are each assigned a respective one of the binary addresses 00, 01, 10, and 11. Each of the lines 1 through 4 is connected to a respective one of an equal number of state change indicators 5 through 8. At the beginning of each line search sequence control unit 9 transmits a logical 1 update signal to all of the state change indicators 5 through 8 via a conductor 10. In response to the update signal on conductor 10 any state change indicator 5 through 8 associated with a line bearing a signal which has changed from a logical 0 to a logical 1 or from a logical 1 to a logical 0 since the preceding update signal generates a logical 1 output.

Figure 2:
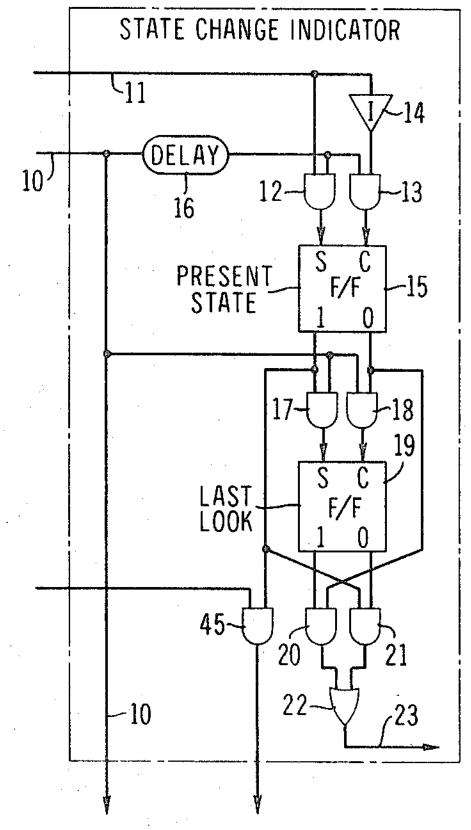
FIG. 2 is a detailed diagram of a state change indicator shown in FIG. 1.

FIG. 2 is a detailed drawing of a state change indicator of the type shown in FIG. 1. A conductor 11 is connected to one of the lines 1 through 4 (FIG. 1) and exhibits the same logical state as that line. Conductor 11 is connected directly to an AND gate 12 and is connected to an AND gate 13 via an inverter 14. The output of AND gate 12 is connected to the set input of a flip-flop 15 and the output of AND gate 13 is connected to the clear input of the same flip-flop. The conductor 10 which conveys the update signals is connected, via a delay unit 16, as a second input to each of the AND gates 12 and 13. Delay unit 16 provides a time delay of duration longer than the duration of an update signal for reasons to be described later herein. If conductor 11 has a logical 1 signal applied to it when the AND gates 12 and 13 receive the update signal from delay unit 16, flip-flop 15 is set to a logical 1 resulting in a logical 1 on its set output and a logical 0 on its clear output. On the other hand, if conductor 11 has a logical 0 applied to it, flip-flop 15 is cleared to a logical 0 and the outputs of this flip-flop will be the reverse of those described immediately above.

The set output of flip-flop 15 is connected as an input to an AND gate 17 and the clear output of flip-flop 15 is connected as an input to an AND gate 18. The outputs of AND gates 17 and 18 are connected to the set and clear inputs respectively of a flip-flop 19. The update signals on conductor 10 are connected as an input to AND gates 17 and 18 so that an update signal causes the state of flip-flop 19 to become the same as the state of the flip-flop 15.

The outputs of flip-flops 15 and 19 are connected to an exclusive OR circuit comprising AND gates 20 and 21 and an OR gate 22. By this connection the output 23 of OR gate 22 represents the exclusive OR of the state of conductor 11 at the most recent update signal, indicated by the flip-flop 15, and the state of conductor at the immediately preceding update signal, indicated by flip-flop 19. Thus, if the signal on conductor 11 changes between update signals on conductor 10 a logical 1 will be generated by OR gate 22 and applied to output conductor 23.

The following is an example of the operation of the state change indicator of FIG. 2. For initial conditions it is assumed flip-flop 15 contains a logical 1, flip-flop 19 contains a logical 0, and the conductor 11 is presently exhibiting a logical 0. In this condition OR gate 22 has a logical 1 output since it represents the exclusive OR of the logical 1 from flip-flop 15 and the logical 0 from flip-flop 19. Upon the receipt of an update signal on conductor 10, AND gates 17 and 18 cause flip-flop 19 to contain a logical 1 in response to the contents of flip-flop 15. Due to the delay unit 16 the update signal to AND gates 17 and 18 terminates prior to the receipt of that signal by AND gates 12 and 13. When the update signal enables AND gates 12 and 13 the present state of the line, which is a logical 0, is gated to flip-flop 15. Since flip-flop 15 now contains a logical 0 and flip-flop 19 contains a logical 1 OR gate 22 again generates a logical 1 output on conductor 23 indicating that the signals on conductor 11 changed state between update signals on conductor 10.

After the transmission of the update signal from the control unit 9 (FIG. 1) each of the state change indicators 5 through 8 (FIG. 1) associated with a line which has changed state has a logical 1 output. The output of each of the state change indicators 5 through 8 is applied via respective one of an equal number of conductors 24 through 27 to an associated selector circuit 28 through 31.

After the transmission of the update signal on conductor 10, control unit 9 transmits the binary address 11 of the last input line 4, to an address register 32. In the present embodiment the first address transmitted after the update signal is the address of the last line. This is the second step of each line search sequence. The contents of address register 32 are applied to a decoder 33 which is a 1-out-of-n decoder of a type well known in the art. In response to each address input, decoder 33 applies a logical 1 to the one of its output conducors 34 through 37 which corresponds to the input address.

In the present example a binary address 11 causes a logical 1 to be applied to selector circuit 28 via a conductor 34, the binary address 00 causes a logical 1 to be applied to selector circuit 29 via a conductor 35, the address 01 causes a logical 1 to be applied to selector circuit 30 via a conductor 36, and the address 10 causes a logical 1 to be applied to selector circuit 31 via a conductor 37. In the following description the selector circuit receiving a logical 1 from decoder 33 is referred to as the selected selector circuit. The outputs of decoder 33 on conductors 34 through 37 are also applied to a pulse generator 38. Pulse generator 38 transmits a reset pulse via a conductor 76 to an output register 46 when a logical 1 occurs on one of the conductors 34 through 37. Pulse generator 38 also transmits a logical 1 pulse on a conductor 39 a fixed period of time after it receives a logical 1 on one of the conductors 34 through 37. The logical 1 on conductor 39 is applied to each of the selector circuits 28 through 31. The fixed interval of time between the receipt by pulse generator 38 of a logical 1 from decoder 33 and the transmission of the logical 1 pulse on conductor 39 is slightly greater than the period of time required by the selector circuits

28 through 31 to respond to a logical 1 from a decoder 33.

Selector circuits 28 through 31 are interconnected to form a sequence in the order of their increasing numerical significance. When a given selector circuit receives a logical 1 from the decoder 33 the line associated with the given selector circuit and all subsequent lines are checked to determine if any of these lines have changed state. When the pulse is received on conductor 39 from pulse generator 38 the selector circuit associated with the first of these checked lines which has changed state transmits a logical 1 to its associated state change indicator and to an address translator 40. The logical 1 from selector circuits 28 through 31 is transmitted on a respective one of a group of conductors 41 through 44.

Each state change indicator 5 through 8 includes an AND gate 45 (FIG. 2) which receives the logical 1 from its associated selector circuit as an input. AND gate 45 (FIG. 2) responds to a logical 1 from its associated selector circuit by transmitting the state of flip-flop 15, which represents the present state of the line, to predetermined positions A of output register 46 via an OR gate 47. The address translator 40 responds to the logical 1 transmitted from the selector circuit on one of the conductors 41 through 44 by transmitting the address of the line associated with the given selector circuit to bit positions C and D of output register 46 via an OR gate 73. Any selector circuit, after the selector circuit which generates the logical 1 output on one of the conductors 41 through 44, which is associated with a line which has changed state, will generate a signal indicating that at least one additional line has changed state. This signal is transmitted to the remaining bit positions B of output register 46 via an OR gate 57.

Figure 3:
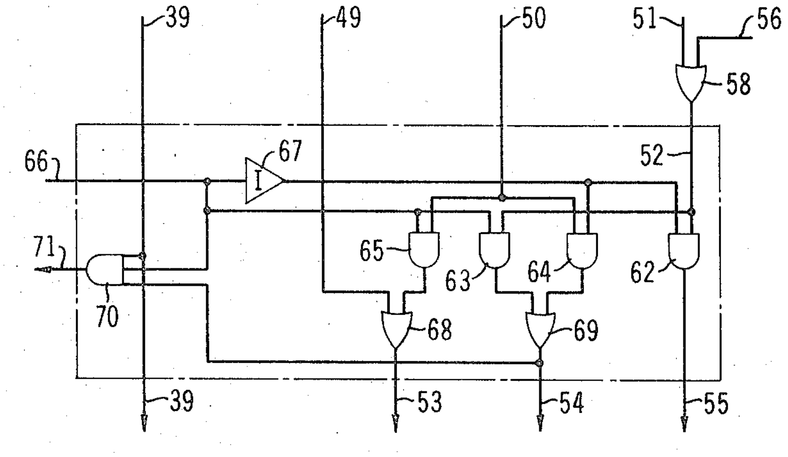
FIG. 3 is a detailed diagram of a selector circuit shown in FIG. 1.

FIG. 3 is a detailed drawing of a selector circuit of the type shown in FIG. 1. This selector circuit has input conductors 49 through 51 and output conductors 53 through 55. Each of the selector circuits except the first selector circuit 28 (FIG. 1) has its inputs 49 through 51 connected to a respective one of the outputs 53 through 55 of the preceding selector circuit. These connections are shown in FIG. 1 by means of a multilead conductor connecting the selector circuits. This multilead conductor also conveys the outputs of pulse generator 38 on conductor 39 to each of the selector circuits. Inputs 49 through 51 of the first selector circuit 28 (FIG. 1) are each connected to a logical 0.

The selector circuit shown in FIG. 3 includes a conductor 56 which is connected to one of the output conductors 34 through 37 of decoder 33 (FIG. 1). Conductor 56 is directly connected as an input to an OR gate 58 which has an output conductor 52. When a given selector circuit receives a logical 1 on conductor 56 from decoder 33 (FIG. 1) the output of OR gate 58 on conductor 52 is a logical 1. On the other hand, when a given selector circuit receives a logical 0 from decoder 33 the output of OR gate 58 on conductor 52 is the same as the signal on the input conductor 51 which is a second input to OR gate 58.

The output of OR gate 58 is connected to a pair of AND gates 62 and 63. The input conductor 50 is connected a an input to another pair of AND gates 64 and 65. A conductor 66 which is connected to one of the outputs 24 through 27 of the state change indicators 5 through 8 (FIG. 1), respectively, is connected as an input to AND gates 63 and 65 and is also connected to AND gates 62 and 64 via an inverter 67. Further, the output of AND gate 65 and the input conductor 49 are combined in an OR gate 68 and the outputs of AND gates 63 and 64 are combined in an OR gate 69. The output of OR gates 68 and 69 and the output of AND gate 62 are the selector circuit outputs 53 through 55, respectively.

Any selector circuit receiving signals 0,0,0 on conductors 49, 50, and 52 generates output signals 0,0,0 on conductors 53, 54, and 55 regardless of the signal on conductor 66. Since, as previously stated, the inputs 49, 50, and 51 of the first selector circuit 28 (FIG. 1) are each logical 0 any selector circuits prior in sequence to the selected selector circuit, which receives a logical 1 on conductor 56, has inputs 0,0,0 on conductors 49, 50, and 52 and outputs 0,0,0 on conductors 53, 54, and 55. The selected selector circuit receives a logical 1 on its conductor 56 from the decoder 33 and by operation of OR gate 58 has signals 0,0,1 on conductors 49, 50, and 52. The selector circuit receiving the logical 1 on conductor 56 and any subsequent selector circuits in sequence are referred to as checked selector circuits and the lines associated with these selector circuits are referred to as checked lines. The outputs of a checked selector circuit on its conductors 53, 54, and 55 are the same as the signals on its conductors 49, 50, and 52, respectively, when the signal on conductor 66 is a logical 0. On the other hand, when the signal on conductor 66 is a logical 1, indicating that the associated line has changed state, the output signals on conductors 53, 54, and 55 with respect to the input signals on conductors 49, 50, and 52 are shown in the following table 1.

Table 1

| | | | |
|---|---|---|---|
| Signals on (49, 50, 52) | 001 | 010 | 100 |
| Outputs on (53, 54, 55) | 010 | 100 | 100 |

The selector circuit (FIG. 3) contains an AND gate 70 which receives as inputs the signals on conductors 39, 54, and 66. AND gate 70 has an output 71 which is connected by one of the conductors 41 through 44 (FIG. 1) to the address translator 40 and to an associated state change indicator 5 through 8. A logical 1 output on conductor 71 indicates that the associated line is the first of the checked lines to have changed state.

When a given selector circuit is selected and receives a logical 1 from decoder 33 on conductor 56 its included OR gate 58 generates a logical 1 output on conductor 52. The logical 1 on conductor 52 results in the signals on conductors 49, 50, and 52 being 0,0,1, respectively. When the line associated with the selected selector circuit has changed state the signal on conductor 66 is a logical 1 and the output signals on conductors 53, 54, and 55 are 0,1,0, respectively (table 1). On the other hand, when the signal on the conductor 66 is a logical 0 the signals on conductors 53, 54, and 55 are 0,0,1 which signals are the same as the inputs on conductors 49, 50, and 52. The first checked selector circuit having a logical 1 on conductor 66 receives the signals 0,0,1 on its conductors 49, 50, and 52 and generates output signals 0,1,0 on conductors 53, 54, and 55, respectively (table 1). Thus, the first checked selector circuit having a logical 1 on its conductor 66 generates a logical 1 on conductor 54. AND gate 70 responds to logical 1's on conductors 54 and 66 of its selector circuit by generating a logical 1 output when the pulse on conductor 39 is applied to it. The next checked selector circuit which has a logical 1 on its conductor 66 receives as inputs on conductors 49, 50, and 51 the signals 0,1,0, respectively, from the outputs 53, 54, and 55 of the first checked selector circuit associated with a line which has changed state. In accordance with table 1, a selector circuit having a conductor 66 with a logical 1 signal generates output signals 1,0,0 on its conductors 53, 54, and 55 when it receives the signals 0,1,0 on conductors 49, 50, and 52. This combination of output signals indicates that more than one checked selector circuit has changed state. When a logical 1 occurs on an output conductor 53 of a checked selector circuit it is transmitted through OR gate 68 of each subsequent selector circuit until it is applied to bit position B of output register 46 (FIG. 1) via an OR gate 57.

The output 55 of the last selector circuit 31 and the pulses from pulse generator 38 on conductor 39 are connected as inputs to an AND gate 74. When the signal on conductors 55 and 39 are logical 1's AND gate 74 is enabled and logical 1's from a logical 1 generator 75 are applied to the bit positions B of output register 46 via OR gate 57 and bit positions C and D of output register 46 via OR gate 73. A logical 1 exists at the time of a pulse on conductor 39 on conductor 55 of selector circuit 31 when none of lines 1 through 4 have changed state since the preceding search sequence. Thus, each time no lines have changed state logical 1's will be placed in bit positions B, C, and D of output register 46. This is done to allow the control unit 9 to differentiate between a response indicating that only the first line has changed state, for which bit positions B, C, and D are 0's, and a response indicating that no lines have changed state which would also comprise logical 0s in bit positions B, C, and D. By placing logical 0's in bit positions B, C, and D. By placing logical 1's in bit positions B, C, and D of output register 46 when none of the lines 1 through 4 have changed state, control unit 9 can distinguish the two situations listed above.

Control unit 9 performs switching functions in accordance with the contents output register 46 and transmits an additional address to address register 32 if further information is to be obtained from the line search arrangement. When bit position B of output register 46 is logical 1 and bit positions C and D are not both logical 1's the binary address in bit positions C and D is transmitted by control unit 9 to address register 32 to initiate another search. On the other hand, when the contents of output register 46 do not meet the above conditions the search is terminated since no further information can be obtained from the line search arrangement.

The following is an example of the operation of the above described line search arrangement in a situation where lines 1 and 3 have changed state since the previous search sequence. Initially control unit 9 transmits an update signal on conductor 10 to state change indicators 5 through 8. Since lines 1 and 3 have changed state since the preceding search sequence the update signal on conductor 10 results in a logical 1 being applied to conductors 24 and 26. Control unit 9 next transmits the binary address 11 to address register 32. Decoder 33 responds to this address by applying a logical 1 to selector circuit 28 via conductor 34. In response to the logical 1 on conductor 34 the pulse generator transmits a pulse to output register 46 via a conductor 76 to clear that register. Selector circuit 28 applies a logical 1 to state change indicator 5 and to address translator 40 via conductor 41 when it receives the pulse on conductor 39 from pulse generator 38. The logical 1 output on conductor 41 indicates that line 1 is the first line in the sequence of checked lines to have changed state. In response to the logical 1 on conductor 41 state change indicator 5 transmits the present state of line 1 to bit position A of output register 46 and address translator 40 transmits the address 00 corresponding to line 1 to bit positions C and D of output register 46. By the previously described interaction of selector circuits 28 through 31 selector circuit 30 which is associated with line 3 generates a signal indicating that another line besides line 1 has also changed state. The signal generated by selector circuit 30 is transmitted via selector circuit 31 to bit position B of output register 46.

Output register 46 now contains the present state of line 1 in bit position A, a logical 1 in bit position B indicating that additional lines have changed state, and the binary address 00 in bit positions C and D. Control unit 9 responds to the logical 1 in bit position B by transmitting the address 00 from bit positions C and D to address register 32. Decoder 33 responds to this address by applying a logical 1 to selector circuit 29 via conductor 35. The output register is again cleared in response to a pulse on conductor 76. Since line 2 which is associated with selector circuit 29 has not changed state, line 3 is the next line in sequence of checked lines which has changed state. For this reason selector circuit 30 transmits a logical 1 on conductor 43 causing the present state of line 3 to be placed in bit position A of output register 46 and address 10 corresponding to line 3 to be placed in bit positions C and D of output register 46. Since no additional lines occurring later in sequence than line 3 have changed state no logical 1 will be placed in bit position B of output register 46. Control unit 9 responds to the contents of output register 46 by performing switching operations with respect to the information in A, C, and D. Since bit position B does not contain a logical 1 the control unit determines that no additional information will be obtained by later commands transmitted to the line search system and the line search sequence terminates.

What is claimed is:

1. An arrangement for determining when any of a plurality of conductors are exhibiting a preselected signal comprising:
- a control unit for transmitting information request signals;
- means responsive to said information request signals and the signals on said conductors for transmitting coded signals defining the location of one of said conductors which exhibits said preselected signal to said control unit; and
- indicating means responsive to said information request signals and signals on said conductors for transmitting a common reaccess signal to said control unit when more than one of said conductors is exhibiting said preselected signal.

2. The arrangement in accordance with claim 1 wherein said control unit transmits an additional information request signal each time it receives a reaccess signal from said indicating means.

3. An arrangement for searching a plurality of conductors, each having an address assigned in accordance with a predetermined address sequence, to determine when a preselected signal exists on any of said conductors, comprising:
- a control unit for transmitting information request signals, which include the address of a selected conductor;
- selector means responsive to said information request signals and signals on said conductors for transmitting to said control unit the address of the first of said conductors, after said selected conductor in accordance with said address sequence, exhibiting said preselected signal; and
- indicating means responsive to said information request signals and signals on said conductors for transmitting a reaccess signal to said control unit when more than one conductor after said selected conductor exhibits said preselected signal.

4. The arrangement in accordance with claim 3 wherein said control unit transmits an additional information request signal each time it receives a reaccess signal from said indicating means.

5. The arrangement in accordance with claim 4 wherein said additional information request signal includes the last address transmitted by said selector means.

6. A line search arrangement comprising:
- a plurality of input lines each having an address assigned in accordance with a predetermined address sequence, for receiving signals representing logical 0's and logical 1's;
- a state change indicator connected to each of said input lines for generating an output signal when the signals on said lines have changed;
- a control unit for transmitting information request signals which include the address of a selected line;
- selector means connected to said state change indicators and responsive to said information request signals and output signals from said state chane indicators for transmitting to said control unit the address of the first of said lines after said selected line in accordance with said address sequence having signals which have changed, wherein said selector means further transmits a reaccess signal to said control unit when the signals on more than one line after said selected line have changed; and
- wherein said control unit responds to said reaccess signals by transmitting an additional information request signal including the address of said selected line.

7. The arrangement in accordance with claim 6 wherein said selector means further transmits to said control unit the signal on the line whose address is transmitted to said control unit.

* * * * *